(12) United States Patent
Sundholm

(10) Patent No.: US 10,013,698 B2
(45) Date of Patent: Jul. 3, 2018

(54) ELECTRONIC PRICE LABEL AND ELECTRONIC PRICE LABEL SYSTEM

(71) Applicant: MARIELLA LABELS OY, Vantaa (FI)

(72) Inventor: Göran Sundholm, Tuusula (FI)

(73) Assignee: MARIELLA LABELS OY, Vantaa (FI)

( * ) Notice: Subject to any disclaimer, the term of this patent is extended or adjusted under 35 U.S.C. 154(b) by 0 days.

(21) Appl. No.: 15/363,561

(22) Filed: Nov. 29, 2016

(65) Prior Publication Data

US 2018/0150859 A1    May 31, 2018

(51) Int. Cl.
| | | |
|---|---|---|
| G06F 19/00 | (2018.01) | |
| G06Q 30/02 | (2012.01) | |
| G06K 7/14 | (2006.01) | |
| G06K 19/06 | (2006.01) | |
| G06K 7/10 | (2006.01) | |

(52) U.S. Cl.
CPC ..... G06Q 30/0207 (2013.01); G06K 7/10742 (2013.01); G06K 7/1413 (2013.01); G06K 19/06028 (2013.01)

(58) Field of Classification Search
CPC ............. G06Q 10/087; G06Q 30/0601; G06Q 30/0641
USPC .................................. 235/383, 385
See application file for complete search history.

(56) References Cited

U.S. PATENT DOCUMENTS

| | | |
|---|---|---|
| 5,151,684 A | 9/1992 | Johnsen |
| 5,241,467 A | 8/1993 | Failing et al. |
| 8,800,869 B2 * | 8/2014 | Waters .................. G06Q 50/28 235/385 |
| 9,245,292 B2 * | 1/2016 | Schweiger ......... G06Q 30/0601 |
| 2007/0013479 A1 | 1/2007 | Goel et al. |
| 2012/0253508 A1 * | 10/2012 | Holmes .................. A47F 1/128 700/232 |
| 2012/0286937 A1 | 11/2012 | Cote et al. |
| 2015/0035674 A1 | 2/2015 | Karhuketo |

FOREIGN PATENT DOCUMENTS

| | | | | |
|---|---|---|---|---|
| EP | 1176565 A2 * | 1/2002 | ............. | G06Q 30/06 |
| FI | 20050192 A | 8/2006 | | |
| WO | WO 2005/083560 A1 | 9/2005 | | |
| WO | WO 2006/087424 A1 | 8/2006 | | |
| WO | WO 2013/153282 A1 | 10/2013 | | |
| WO | WO 2015/136146 A1 | 9/2015 | | |

OTHER PUBLICATIONS

Finnish Search Report dated Sep. 12, 2015 for Application No. FI-20155494.
4 Extended European Search Report for European Application No. 16200908.8, dated Jan. 5, 2017.

* cited by examiner

*Primary Examiner* — Seung Lee
(74) *Attorney, Agent, or Firm* — Birch, Stewart, Kolasch & Birch, LLP

(57) ABSTRACT

An electronic price label system and an electronic price label, the electronic price label includes: a communication module for receiving product related information, a display for displaying product related information. The electronic price label further includes indication members which are configured to indicate that the products related to electronic price label have to be inventoried.

17 Claims, 2 Drawing Sheets

ELECTRONIC PRICE LABEL AND ELECTRONIC PRICE LABEL SYSTEM

FIELD OF THE INVENTION

The invention relates to electronic price label and electronic price label system.

BACKGROUND OF THE INVENTION

Conventionally, the price information on price tags in shops is always changed manually when the price of the product is changed. The new prices are printed out on paper or a corresponding material, and these tags with their new price markings are placed manually in a location reserved for the price tags on shelves in the sales premises. Thus, an employee must first find the correct location of the price tag to be updated, after which the previous price tag is removed and discarded and the new price tag is inserted in its position. A disadvantage in this arrangement is, among other things, the fact that the arrangement is very laborious and there is a high risk of mistakes. In case of a mistake, a situation may, for example, occur, in which the price information on the price tags on the shelves conflicts with the price information in the cash register system.

To avoid the above-mentioned drawbacks, electronic systems have been developed, in which electronic price display units and their electronic displays are provided on the front edge or above the shelves, close to the products, in which the price information of the products can be changed in a centralized manner from the control center of the system, or the like. This will facilitate and accelerate the updating of the price information to a significant extent.

Also Point-of-Sale (POS) systems are used in the retail environment. The POS-systems of the prior art are used in various retail situations and they are implemented with hardware and software tailored to their particular requirements. Retailers may utilize weighing scales, scanners, electronic and manual cash registers, EFTPOS terminals, touch screens and a variety of other hardware and software available. POS software may also include additional features to cater for different functionality, such as inventory management, CRM, financials, warehousing, etc.

It's also known to use inventory or stock control systems in retail environment. Typical features of stock control systems include e.g. ensuring that the products are on the shelf in shops in just the right quantity, recognizing when a customer has bought a product, signaling when more products need to be put on the shelf from the stockroom, reordering stock at the appropriate time from the main warehouse, producing management information reports that could be used both by the store and also at head office.

Regular inventory checks are carried out in stores to check that the information of the inventory management system corresponds to the real situation of the store. With above described prior art systems it's not possible to easily indicate which products in the store have been inventoried and which products still have to be inventoried. With the prior art systems it's also not possible to carry out continuous inventory checking process but the inventory check has to be done e.g. in one day and so that the store has to be closed during the inventory check.

SUMMARY OF THE INVENTION

It is an aim of the present invention to reduce the above-mentioned problems and simultaneously provide an electronic price label and an electronic price label system.

The electronic price label according to the invention is presented in claim 1 and the electronic price label system according to the invention is presented in claim 10. Other embodiments of the invention are characterized in what will be presented in the other claims.

The idea of the invention is to provide an electronic price label which comprises indication means configured to indicate that the products related to electronic price label have to be inventoried. The electronic price label system and/or the base station of the electronic price label system according to the invention is configured to send an inventory indication command to the at least one electronic price label so that the electronic price label would indicate that the products related to the specific electronic price label have to be inventoried.

In one embodiment of the invention the indication means comprises a light source such as a LED-light source and indication can be implemented e.g. by turning on or off and/or flashing the light source.

In one embodiment of the invention the indication means is implemented by altering the colors of the display of the electronic price label in such a way, that the indication can be seen, e.g. by inverting the colors.

With the solution of the current invention it's possible to have an electronic price label and an electronic price label system which is able to easily indicate to store personnel which products in the store have been inventoried and which products still have to be inventoried. The solution of the invention also enables continuous inventory checking process in which only a part of the products of the store are inventoried daily. This has the benefit that not all products of the store have to be inventoried in one day but the store can be kept open and the personnel can inventory e.g. only a part of the products and the store can be kept open. This functionality is enabled by the indication which doesn't disturb the customers and at the same time is able to inform the personnel whether the products related to certain electronic labels have been inventoried and which products still need to be inventoried.

DESCRIPTION OF THE DRAWINGS

In the following, the invention will be described in more detail by means of an embodiment example with reference to the appended drawings, in which.

DETAILED DESCRIPTION OF THE INVENTION

Figure 1:
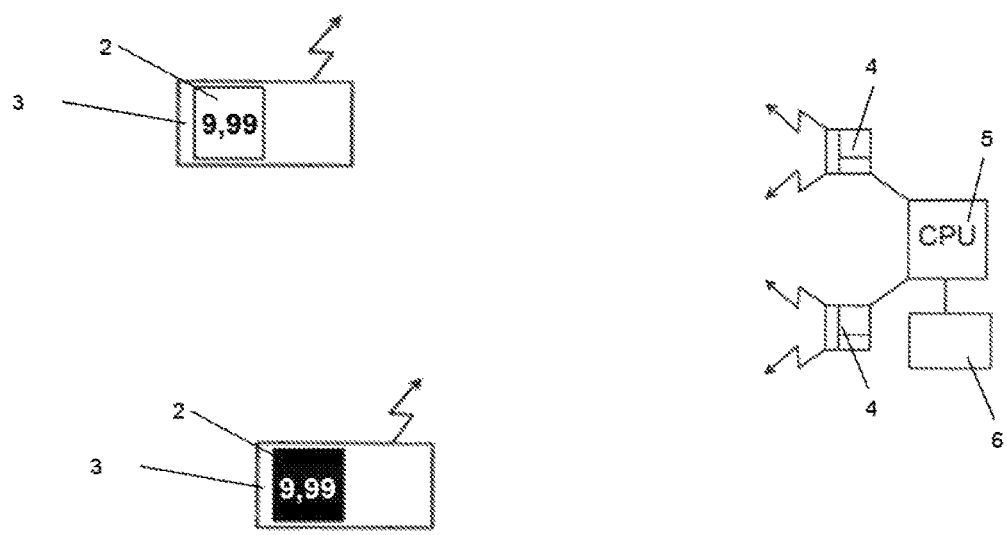
FIG. 1 shows a schematic and simplified view of an example arrangement of the electronic price label system in a store or in corresponding sales premises.

FIG. 1 shows schematically, as an example, a typical arrangement of the electronic price label system in a store or similar sale environment.

Electronic price labels 3 are located near products e.g. on edges of the product shelves or as hanging price displays such that they are easily perceivable for the customers. The display 2 is arranged to display the price of the product, and the product information contains, among other things, the name of the product and possibly some other information relating to the product. The electronic price label 3 can also have a separate indication marking, e.g. color-marking, which can indicate product related information such as a sale promotion for the product, sale promotion to regular customers for the product and/or a new product.

Each electronic display 2 can constitute a thin price tag equipped with display segments and/or pixels and optionally resembling a paper price tag, in which the required product prices and other necessary symbols are formed by changing the color of the substantially two-colored or multicolored display segments and/or pixels.

One layer of the display is, for example, an active ink layer. The ink layer contains a number of microcapsules filled with liquid and containing, for example, substantially black particles with a positive surface charge and substantially white particles with a negative surface charge, whose location in the microcapsules is controlled by an electric field so that at the desired display segments, the black particles are on top, wherein said display segments look black when viewed from above, and at the other display segments, the white particles are on top, wherein these display segments look white when viewed from above. The background of the display consists of the same microcapsules, wherein, for example, the price information can be displayed as dark numbers against a light background, or vice versa, if desired. Such a display used can be, for example, the electrophoretic microcapsule display laminate disclosed in Finnish patent application No. FI 20050192.

The display of the electronic price label can also be e.g. segment-based LCD-display or graphic display which uses e.g. DotMatrix e-paper technology.

The electronic price labels 3 can have multiple memory locations for the information, for example for price information. The electronic price labels 3 can also comprise multiple different views stored in the memory locations i.e. different pages that include different information to be displayed.

Furthermore, the electronic price label system comprises at least a central processing unit 5 connected to a base station 4 or other communication means, via which it is possible to transmit, for example, updated price information and other control information to the display 2. Furthermore, the system may comprise scanners 6 located at cash registers and connected to the cash register system, for scanning the price, wherein the cash register system and the electronic price labels always have the same up-to-date information on the prices of the products. Furthermore, the central processing unit 5 may be coupled to other controlling and supporting systems, e.g. to a point of sale system of a store. The wireless connection between the central processing unit 5 and the electronic price labels 3 is illustrated with arrows.

The electronic price labels 3 communicate in a wireless manner with the base station 4 shown in FIG. 1. This wireless communication method may be based on any known wireless communication technology, but in order to save battery life of the electronic price labels 3, passive backscatter radio communication can be implemented. In this approach the base stations 4 actively send radio signals and instead of answering with active radio transmission, the electronic price labels 3 do not use a radio transmitter; instead, they answer by modulating the reflected power of the base station signal. The modulation is achieved, typically, by changing the load state of the antenna in the electronic price labels 3, for example, by connecting and disconnecting the antenna between the ground and non-ground potential. This modulation of the backscattered signal allows for the electronic price labels 3 to answer to the base stations and further to the store level server.

The communication between electronic price labels and base stations can also be based on infrared communication. The infrared communication can be e.g. bi-directional and/or diffuse infrared communication, so that the transmitter and the receiver don't need to have line of sight.

Each electronic price label 3 can be identified by its own identification code that the electronic price label 3 in question knows to listen for in the transmission from the base station 4. After receiving new information, instructions or commands from the store server via base station 4, the electronic price label 3 can acknowledge the reception of these instructions by using the reflected backscattering modulated properly and timely for the store level server to identify that the response is coming from the electronic price label 3 is question. To facilitate that the store server may have a certain listening period after a transmission directed to a certain electronic price label 3 for giving the module possibility to answer during that time.

The electronic price label 3 of the electronic price label system comprises indication means which are configured to indicate that the products related to electronic price label have to be inventoried.

In one embodiment of the invention the indication means can be a light source such as a LED-light source and indication can be implemented e.g. by turning on or off and/or flashing the light source. The light source can be a separate light source or it can be integrated to the display of the electronic price label.

In one embodiment of the invention the indication means is implemented by altering the colours of the display of the electronic price label in such a way, that the indication can be seen, e.g. by inverting the colours of at least part of the display. In the FIG. 1 one of the price labels has normal colours on the screen and the other price label has inverted colours on the screen. The price labels are indicating that the products related to electronic price label have been inventoried with the price label with normal colours or have to be inventoried with the price label with inverted colours.

The electronic price label system and/or the base station of the electronic price label system is configured to send an inventory indication command to the at least one electronic price label which commands and/or instructs the electronic price label to indicate that the products related to the specific electronic price label have to be inventoried. This way the store personnel is able to known which products have been inventoried and which products still require inventory.

The system can further comprise at least one user device and the user can first count the products related to one electronic price label and then input the number to the user device which sends the number to the system and/or a product database. At the same time the indication means of the electronic price label can be changed to indicate that the products relating to this specific label have been inventoried by switching the indication means to deactivated and/or normal state.

The user device can indicate where the products and/or electronic labels to be inventoried are located, e.g. by indicating route and/or direction to the product and/or the electronic label related to the product.

The identification information of the electronic label and/or product, e.g. barcode or RFID, can be read with the user device. Based on the identification information of the electronic label and/or product the user device can display product related information, e.g. product name, on the display of the user device. The user can then count the number of products and the user device can be used to input the number of the products to the system and/or the product database of the system. The inputted number can be linked to a specific product in the database based on the identification information read by the user device. The system can then compare the number received from the user device to the number stored on the database. If the number of the products received from the user device is different than the number of the products stored in the database, the system can create an alarm and/or notification and can ask the user to check the number of the products again. When the number is inputted to the system, checked and/or accepted, a signal or command can be send to the electronic price label that the indication can be switched to normal state, e.g. such that the indication light source is switched of and/or the colours of the display are changed to normal state. The signal can be sent to the electronic price label through the electronic price label system or alternatively the device can send the signal direct to the electronic price label. After this the user device can guide the user to the next product and/or electronic label related to the products which need to be inventoried.

Figure 2:
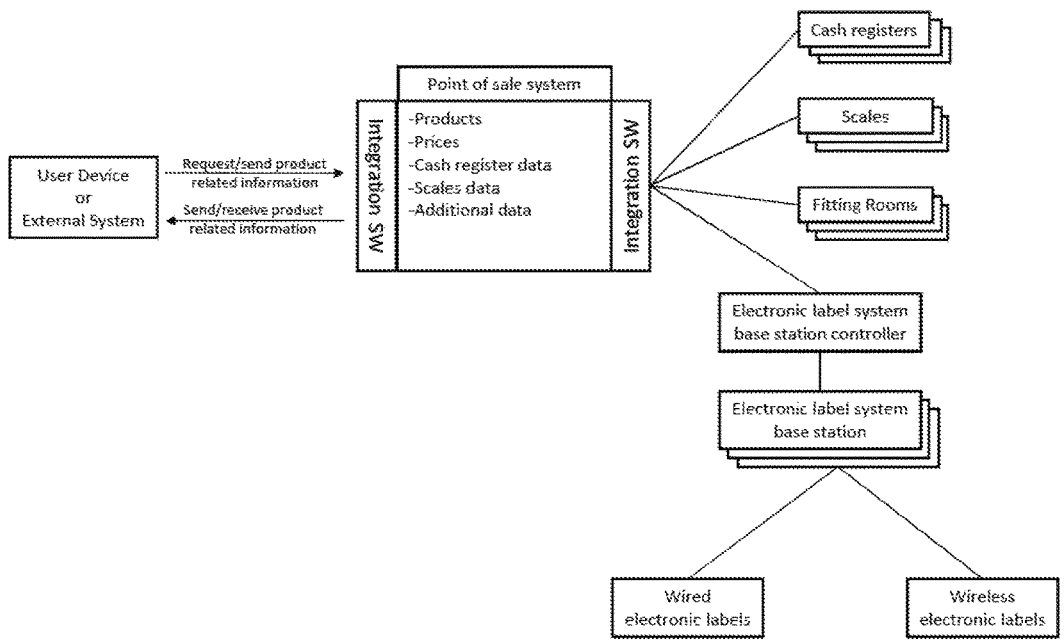
FIG. 2 shows an example implementation of an electronic price label system with inventory management and point of sales system.

FIG. 2 presents an example implementation of the electronic price label system when it's used with an inventory management system and/or point of sale system. The inventory management system comprises a product database in which products are listed (product database not shown in the FIG. 2). The product database can also include information about the number of products.

The inventory management system and/or electronic label system can also comprise a point of sale system or be connected to a point of sale system which can used to manage prices, stock, scales data, cash register data or other similar sale or product related data of a store. A user device can communicate with the point of sale system of a store through an interface. The point of sale system can be connected through an interface also to cash registers, scales and an electronic price label system. Trough the interface the point of sale system can e.g. update information on cash registers and scales or gather information on activities such as sales on the cash registers or scales.

When a user device or an external system wants to receive information about a certain product or plurality of products, it can request information about the products from the system. The inventory management system and/or electronic label system receives the query request about information of products and/or electronic labels linked to the products and sends information as a response.

It is clear for a person skilled in the art that the software applications, communicational functions and other functions of the system described schematically in FIGS. 1 and 2 can be arranged in a wide variety of different ways depending on the details of the application in question. FIGS. 1 and 2 only aim to provide a high level illustration as an example to aid for understanding the benefits of the invention described here.

The present invention relates to an electronic price label for an electronic price label system, the electronic price label 3 comprising a communication module for receiving product related information and a display 2 for displaying product related information. The electronic price label 3 further comprises indication means which are configured to indicate that the products related to electronic price label have to be inventoried.

In one embodiment of the invention indication of the indication means is implemented by altering the colours of the display 2 of the electronic price label 3 in such a way, that the indication can be seen, e.g. by inverting the colours.

In one embodiment of the invention indication means is a light source such as a LED-light source and indication can be implemented e.g. by turning on or off and/or flashing the light source.

In one embodiment of the invention the electronic price label 3 is configured to turn the indication means to activated state, e.g. turn indication light source on and/or use inverted colours on the display, based on a received inventory indication command.

In one embodiment of the invention the electronic price label 3 is configured to turn the indication means to deactivated state, e.g. indication light source off and/or normal colours on the display, based on a received inventory indication stop command.

In one embodiment of the invention the communication module of the electronic price label communicates with a base station of an electronic price label system by reflecting back a signal it receives.

In one embodiment of the invention the display 2 is an electronic ink display, such as a bistable E-Ink-segment display.

In one embodiment of the invention product related information is price of the product, sale price of the product and/or amount of discount.

In one embodiment of the invention communication module comprises an antenna and is configured to communicate with on 868 MHz frequency band, 2.4 GHz frequency band or any other frequency band allowed to be used for an electronic price label system.

The invention relates also to an electronic price label system which comprises plurality of electronic price labels and at least one base station configured to send and receive information with any of the electronic price labels. The electronic price label system and/or the base station of the electronic price label system is configured to send an inventory indication command to the at least one electronic price label for the electronic price label, the command indicating that the products related to the specific electronic price label have to be inventoried.

In one embodiment of the invention the system is configured to provide information about the products which have been inventoried and/or about the products which have not been inventoried.

In one embodiment of the invention the system is configured to send an inventory indication stop command to the at least one electronic price label based on information that products relating to the specific electronic price label have been inventoried.

In one embodiment of the invention the system further comprises a user device and the user device is configured to receive a number of certain products as an input from a user of the user device and the user device is further configured to send the received number of products to the system and/or a product database.

In one embodiment of the invention the user device is configured to indicate where the products and/or electronic labels to be inventoried are located, e.g. by indicating a route and/or a direction to the product and/or to electronic label relating to the product.

In one embodiment of the invention the electronic label system is connected to an inventory management system which comprises a product database in which products are listed.

In one embodiment of the invention the electronic label system and/or the user device is configured to send an updated number of products related to a specific electronic price label to the inventory management system and/or a product database in which products are listed.

In one embodiment of the invention the system is configured to compare received number of products to the stored number of products.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

The invention claimed is:

1. An electronic price label for an electronic price label system, the electronic price label comprising:
a communication module for receiving product related information,
a display for displaying product related information,
wherein the electronic price label further comprises:
indication means which are configured to indicate that the products related to electronic price label have to be inventory checked,
wherein indication of the indication means is implemented by altering the colours of the display of the electronic price label in such a way, that the indication can be seen, by inverting the colours of at least part of the display,
wherein the electronic price label is configured to turn the indication means to deactivated and/or normal state, indication light source off and/or normal colours on the display, based on a received inventory checked indication stop command.

2. An electronic price label according to claim 1 wherein indication means is a light source, a LED-light source, and indication can be implemented by turning on or off and/or flashing the light source.

3. An electronic price label according to claim 1 wherein the electronic price label is configured to turn the indication means to activated state, turn indication light source on and/or use inverted colours on the display, based on a received inventory checked indication command.

4. An electronic price label according to claim 1 wherein communication module communicates with a base station of an electronic price label system by reflecting back a signal it receives.

5. An electronic price label according to claim 1 wherein the display is an electronic ink display, a bistable E-Ink-segment display.

6. An electronic price label according to claim 1 wherein product related information is price of the product, sale price of the product and/or amount of discount.

7. An electronic price label according to claim 1 wherein communication module comprises an antenna and is configured to communicate with on 868 MHz frequency band, 2.4 GHz frequency band or any other frequency band allowed to be used for an electronic price label system.

8. An electronic price label system wherein the system comprises:
a plurality of electronic price labels each of the plurality of electronic price labels comprising:
a communication module for receiving product related information,
a display for displaying product related information,
wherein the electronic price label further comprises:
indication means configured to indicate that the products related to the electronic price label have to be inventory checked,
wherein indication of the indication means is implemented by altering the colours of the display of the electronic price label wherein the indication can be seen, by inverting the colours of at least part of the display,
at least one base station configured to send and receive information with any of the electronic price labels, and
wherein the electronic price label system and/or the base station of the electronic price label system is configured to send an inventory checked indication command to the at least one electronic price label for the electronic price label, the command indicating that the products related to the specific electronic price label have to be inventory checked.

9. An electronic price label system according to claim 8, wherein the system is configured to provide information about the products which have been inventory checked and/or about the products which have not been inventory checked.

10. An electronic price label system according to claim 8, wherein the system is configured to send an inventory checked indication stop command to the at least one electronic price label based on information that products relating to the specific electronic price label have been inventory checked.

11. An electronic price label system according to claim 8, wherein the system further comprises a user device and the user device is configured to receive a number of certain products as an input from a user of the user device and the user device is further configured to send the received number of products to the system and/or a product database.

12. An electronic price label system according to claim 8, wherein the user device is configured to indicate where the products and/or electronic labels to be inventory checked are located, by indicating a route and/or a direction to the product and/or electronic label relating to the product.

13. An electronic price label system according to claim 8, wherein the electronic label system is connected to an inventory checked management system which comprises a product database in which products are listed.

14. An electronic price label system according to claim 8, wherein the electronic label system and/or the user device is configured to send an updated number of products related to a specific electronic price label to the inventory checked management system and/or a product database in which products are listed.

15. An electronic price label system according to claim 8, wherein the system is configured to compare received number of products to the stored number of products.

16. An electronic price label for an electronic price label system, the electronic price label comprising:
a communication module for receiving product related information,
a display for displaying product related information,
wherein the electronic price label further comprises:
indication means which are configured to indicate that the products related to electronic price label have to be inventory checked, said indication means is a light source, a LED-light source, and indication can be implemented by turning on or off and/or flashing the light source,
wherein the electronic price label is configured to turn the indication means to deactivated and/or normal state, indication light source off and/or normal colours on the display, based on a received inventory checked indication stop command.

17. An electronic price label system wherein the system comprises:
a plurality of electronic price labels each comprising:
a communication module for receiving product related information,
a display for displaying product related information, wherein the electronic price label further comprises:
indication means which are configured to indicate that the products related to electronic price label have to be inventory checked, said indication means is a light source, a LED-light source, and indication can be implemented by turning on or off and/or flashing the light source
at least one base station configured to send and receive information with any of the electronic price labels, and
wherein the electronic price label system and/or the base station of the electronic price label system is configured to send an inventory checked indication command to the at least one electronic price label for the electronic price label, the command indicating that the products related to the specific electronic price label have to be inventory checked.

* * * * *